Sept. 3, 1946.  G. G. McNAMARA, JR  2,407,092
VEHICLE
Filed Aug. 1, 1942
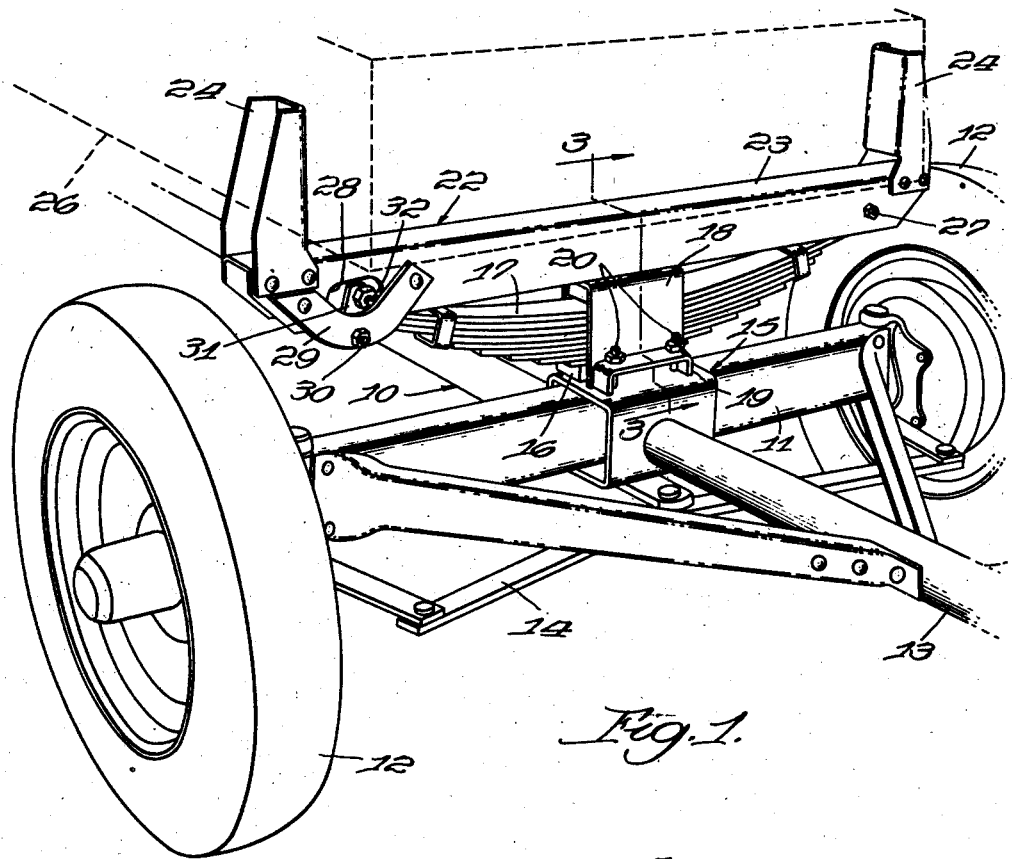
Fig. 1.
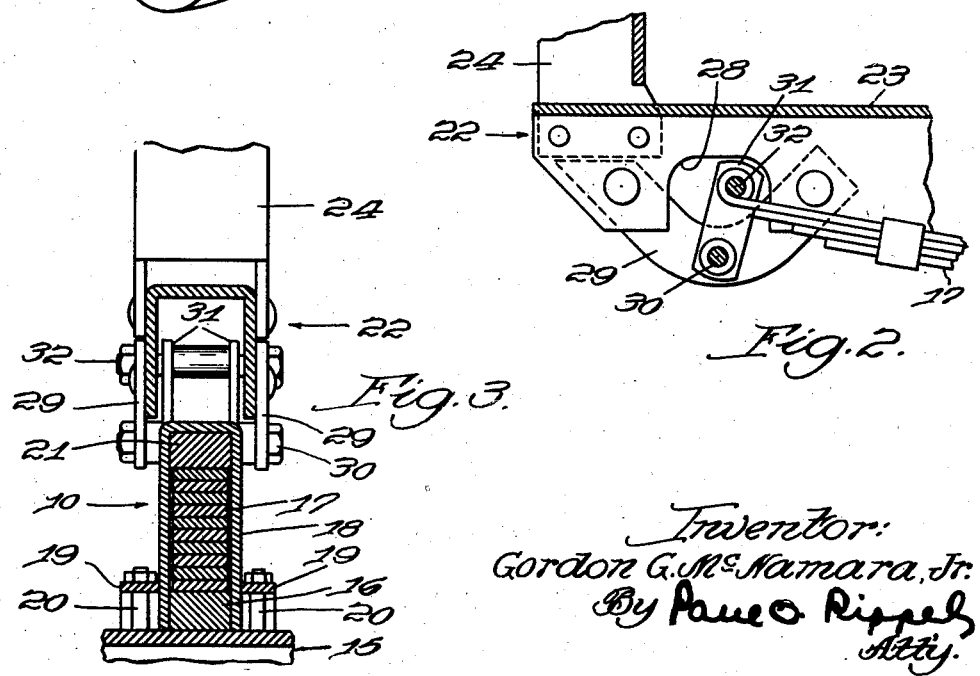
Fig. 2.
Fig. 3.
Inventor:
Gordon G. McNamara, Jr.
By Paul O. Rippel
Atty.

Patented Sept. 3, 1946

2,407,092

UNITED STATES PATENT OFFICE 2,407,092

VEHICLE

Gordon G. McNamara, Jr., Chicago, Ill., assignor to International Harvester Company, a corporation of New Jersey Application August 1, 1942, Serial No. 453,178

2 Claims. (Cl. 267—7)

This invention relates to a vehicle and, more particularly, to improvements in the supporting of a frame or body on the running gear of a vehicle.

Although the invention may be adapted for use in any form of vehicle construction, it is especially adapted for vehicles of light-weight construction, since the invention in its preferred form is particularly capable of embodiment in a manner consistent with simple and inexpensive constructional details characteristic of such vehicles. A particular example of a vehicle of this type is a trailer. Such trailer ordinarily includes front and rear axle structures connected by a longitudinally extending reach, and each of the axle structures supports a transverse frame member between which a load may be carried. These two frame members ordinarily represent the load-supporting frame of the trailer, and different types of bodies may be carried by these members. The frame members are supported on the axle structures by spring means of usual type, so that the loaded frame is resiliently supported by the running gear of the trailer. Because of the fact that the general construction of the vehicle omits many of the structural features of more expensive vehicles, certain disadvantages have heretofore been noted. One of these is the tendency of the load-supporting frame to shift horizontally with respect to the running gear when the trailer is started or stopped suddenly.

The principal object of the present invention is to provide means for eliminating the aforesaid disadvantage, and specifically to provide guide means between the running gear and the frame which permits relative vertical movement between the two, but which prevents relative horizontal shifting.

Another important object is the provision of an improved mounting for the spring that supports the load-carrying frame on the running gear, said spring mounting including a portion of the guide means for preventing relative shifting between the frame and the running gear.

Other important objects and desirable features of the invention will become apparent as the disclosure is more fully made in the following detailed description and accompanying sheet of drawings, in which:

Figure 1 is a perspective view of the front end portion of a trailer embodying the invention;

Figure 2 is an enlarged, fragmentary view, partly in section, showing the mounting for one end of the spring; and Figure 3 is a transverse sectional view substantially along the line 3—3 of Figure 1, illustrating the mounting of the center portion of the spring and the guide means.

As previously stated, the invention, in its broadest form, is applicable to vehicles of any type. Accordingly it is to be understood that the specific disclosure is only illustrative and not limiting.

Figure 1 illustrates the front end of a trailer comprising a running gear, indicated generally at 10, including a front axle structure 11, wheels 12, draft tongue 13, and steering linkage 14. It will be understood that the rear portion of the trailer is similarly constructed, with the exception of the omission of the steerable wheels. The intermediate portion of the front axle structure 11 includes supporting structure 15 having a central supporting block 16, on which is mounted a transverse leaf-spring 17. A saddle in the form of an inverted U-shaped member 18 embraces the center portion of the spring 17 and has its lower ends rigidly secured to a pair of connecting members 19, both of which are rigidly secured by bolts 20 to the supporting structure 15. An upper block 21 is interposed between the top of the spring and the top of the U-shaped member 18. This means provides for the mounting of the spring 17 on the running gear 10.

The trailer includes a load-supporting frame, indicated generally at 22, and comprises a transverse bolster 23 in the form of a U-shaped channel having its opposite ends provided with vertical members 24. The rear end of the trailer, not shown, may include similar structure, and the two members, such as the member 23, serve to support a load therebetween. A body or similar load-carrying structure is indicated in dotted lines at 26.

The spring 17 is made up of a plurality of spring leaves, as is conventional, and one end is attached by a bolt 27 to one end of the channel bolster 23. The other end of the channel bolster or member has its opposite side portions cut out to provide openings 28. Each of the sides of this end of the channel member carries an L-shaped supporting bracket 29, these brackets being rigidly secured to the channel by any suitable means. The central portion of each bracket is disposed in vertical alinement with the corresponding opening 28, and these portions carry a transverse pin or bolt 30 for the mounting of a pair of upwardly extending links or shackle members 31. The upper ends of these links are crossconnected by a bolt 32 which also mounts the other end of the spring 17.

From the description thus far it will be seen that the leaf-spring 17 resiliently supports the load-carrying frame 22 on the running gear 10, these two parts thus having relative vertical movement. As stated previously, the rear ends of the frame and running gear are similarly associated. As best shown in Figure 3, the channel bolster 23 is disposed directly above the U-shaped saddle 18 on the running gear 10. It will be noted further that the inside of the channel 23 is so dimensioned as to be capable of fitting over the saddle 18 upon relative vertical movement of these two parts toward each other. Consequently, when the frame 22 is deflected toward the running gear, as by a heavy load, or otherwise, the channel 23 may embrace the saddle 18. However, the resiliently controlled, relatively vertical movement between the frame and running gear is not interfered with, the channel 23 and saddle 18 serving as a pair of interengaging guide means. Thus, when the channel and saddle are interengaged, relative horizontal shifting longitudinally between the frame 22 and running gear 10 is prevented.

The result just described is of considerable importance in vehicle construction. For example, in the type of vehicle herein illustrated, the spring 17 serves as the sole supporting means between one end of the frame 22 and the proximate end of the running gear 10. In addition to stresses imposed by relative vertical movement between the frame and running gear, the spring must take all other stresses. Certain of these forces and impositions of stress are not such as to overtax the spring; however, it has been found that relative longitudinal movement between the frame and running gear, caused by the sudden stopping and starting of the vehicle, twists the spring to such an extent that the life of the spring is considerably shortened. According to the present invention, however, this disadvantage is eliminated, inasmuch as the cooperation between the channel 23 and saddle 18 literally locks the frame and running gear together and against this relative longitudinal shifting.

It will be seen from the foregoing description that an improved supporting construction has been provided for vehicles in general and for light-weight vehicles in particular. It will be understood, of course, that the principles embodied in the locking of the frame and running gear against relative longitudinal shifting may be similarly employed to lock these parts against any other undesirable movement. Other changes and modifications will undoubtedly suggest themselves to those versed in the art, all of which may be made without departing from the spirit and scope of the invention as defined in the appended claims.

What is claimed is:

1. In a vehicle including running gear and a load-supporting frame, a support associated with the running gear, a transverse inverted channel associated with the frame and disposed above the support, a concave transverse leaf spring, an inverted U-shaped guide member embracing the lower center portion of the leaf spring and affixed to said support, the upwardly extending ends of the leaf spring fastened within the inverted channel, said inverted U-shaped guide member in normal unloaded vehicle position terminating immediately beneath the lower edge of the inverted channel, said U-shaped guide member adapted to have a sliding fit within said inverted channel, whereby upon application of any load to the vehicle the U-shaped guide telescopes the inverted channel preventing the frame and running gear from relative horizontal shifting.

2. In a heavy duty pneumatic tired vehicle including a running gear, the combination therewith of a transverse bolster for supporting a load, a transverse semi-elliptic multiple leaf spring connected at its ends to said bolster, means for rigidly securing the center portion of the spring to the running gear, said spring constituting the only positive connection between the running gear and bolster whereby all fore and aft, vertical and lateral forces on the bolster tend to act against the spring, an inverted U-shaped guide member embracing the center of the spring, parallel longitudinally spaced, transversely extending vertical flanges projecting downwardly from the bolster to a position immediately above and in telescopic alinement with respect to the U-shaped guide member when the bolster is unloaded and adapted to telescope said guide member with a sliding fit when a load is supported on the bolster to resist fore and aft inertia forces and to thereby prevent twisting of the spring about a transverse axis.

GORDON G. McNAMARA, Jr.